United States Patent [19]

Riddle

[11] Patent Number: 4,993,914
[45] Date of Patent: Feb. 19, 1991

[54] FALLEN TREE REMOVAL IMPLEMENT

[76] Inventor: James W. Riddle, 1103-2A Buckingham Station Dr., Midlothian, Va. 23113

[21] Appl. No.: 357,893

[22] Filed: May 30, 1989

[51] Int. Cl.$^5$ .............................................. B66C 3/16
[52] U.S. Cl. .................................. 414/738; 294/115; 294/902; 414/703; 414/744.2
[58] Field of Search ............... 414/703, 744.1, 744.2, 414/729, 738; 172/449, 447, 498; 37/2 R, 2 P; 294/86.4, 88, 115, 902, 107, 120; 254/132, 133 R; 144/30

[56] References Cited

U.S. PATENT DOCUMENTS

| | | | |
|---|---|---|---|
| Re. 23,895 | 11/1954 | Winget | 37/2 P |
| 3,057,599 | 10/1962 | Clatterbuck | 254/132 |
| 4,161,200 | 7/1979 | Albright | 144/30 X |
| 4,209,280 | 6/1980 | Bittner | 294/902 X |
| 4,304,433 | 12/1981 | Langowski | 294/115 X |
| 4,452,481 | 6/1984 | Williams | 294/902 X |

Primary Examiner—Frank E. Werner
Assistant Examiner—Donald W. Underwood
Attorney, Agent, or Firm—Edgar W. Averill, Jr.

[57] ABSTRACT

A farm implement for transporting fallen trees. The implement is attached to a tractor. A pair of hydraulically operated arms have grabbing jaws near the end thereof and close against the roots of a fallen tree. The implement is then raised by the tractor, and the tree may be easily transported.

17 Claims, 3 Drawing Sheets

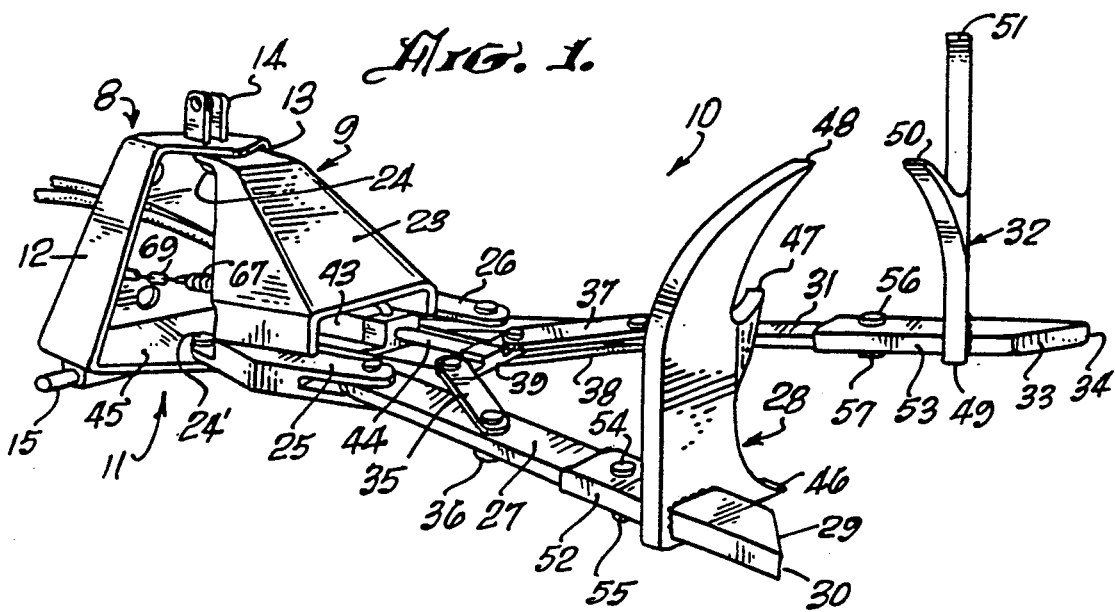
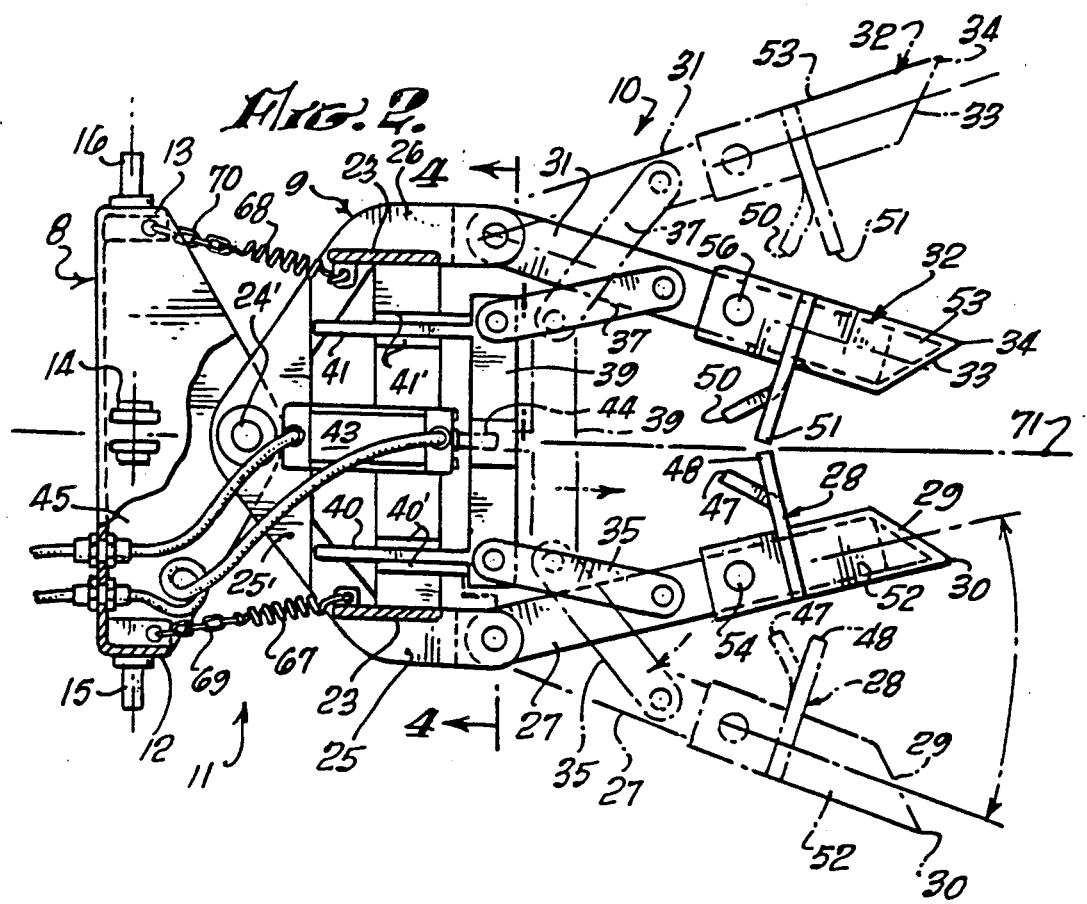

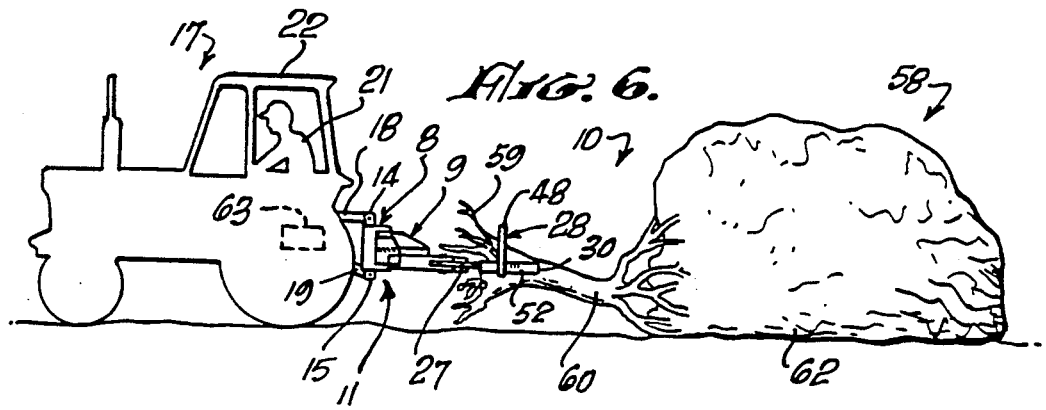
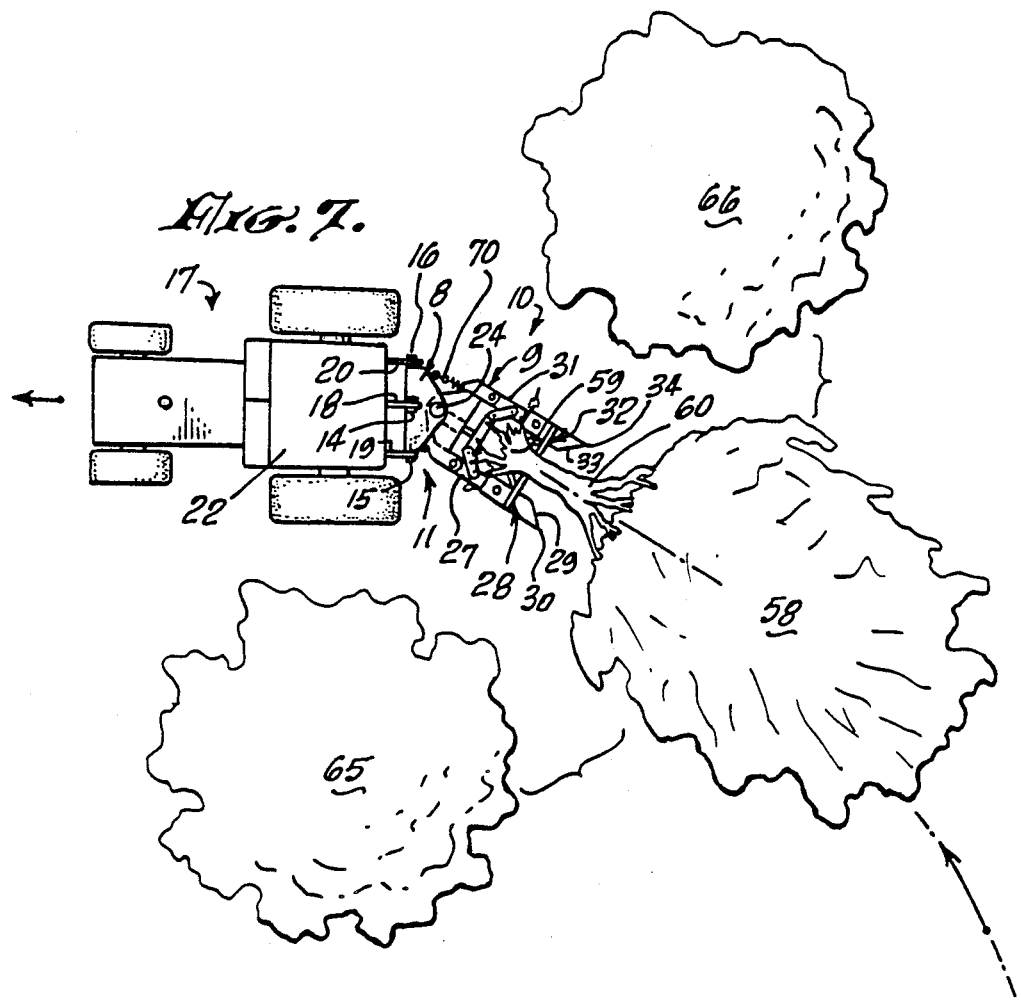

FALLEN TREE REMOVAL IMPLEMENT

BACKGROUND OF THE DISCLOSURE

The field of the invention is farm implements, and the invention relates more particularly to implements for transporting fallen trees. In any large mature orchard, there are a number of nonproducing trees which should be removed each year to optimize the production of the orchard. After the trees are removed, the soil must be groomed to its original grade for best harvest conditions.

The present most common system for removing fallen trees from tree orchards is as follows:

After the tractor backs up to the fallen tree, the driver must dismount from the tractor and secure a chain around the root system of the tree. Shovel work is often required for this procedure. The tractor then drags the tree out of the orchard while the roots plow large divots into the soft, moist soil. Once the tree is pulled to the lay-down area, the driver must again dismount the tractor and remove the chain from the tree's tangled root system. This is also a time-consuming and dirty procedure. For a large orchard such as a 4,000-acre orchard, there are approximately 8,000 nonproducing trees to remove each year. Thus, the amount of time required for tree removal and soil repair is substantial.

SUMMARY OF THE INVENTION

It is an object of the present invention to provide a more efficient implement for the transporting of fallen trees.

The present invention is for a farm implement for transporting fallen trees, said implement being attachable to a tractor of the type which has a raiseable attachment means and which also has power takeoff means. The implement has a frame, having at least one point of attachment to the raiseable attachment means of the tractor. A first arm is horizontally hinged to the frame, and it is movable from an open position to a closed position and has an inner hinged end and an outer terminus. A first grabbing jaw is affixed to the first arm near the terminus thereof. A second arm is horizontally hinged to the frame and is also moveable from an open position to a closed position. It has an inner hinged end and an outer terminus, and the first and second arms move in a single plane. A second grabbing jaw is affixed to the second arm near the terminus thereof. Synchronizing means connect the two arms and cause them to move together and apart simultaneously. Means to open and close the arms are provided whereby the implement may be positioned about the roots of a fallen tree when the arms are apart. Next, the arms are closed to cause the first and second grabbing jaws to grasp the roots which may then be lifted by raising the implement and held by the jaws as the tree is moved. The tree is thus supported both by the implement which holds the roots off the ground and by its branches which distribute the weight over a wide enough area to eliminate any significant damage to the soil. Preferably, the grabbing jaws have a plurality of inwardly directed teeth. In a preferred configuration, each jaw has three teeth with the middle tooth oriented away from the terminus of the jaws and inwardly toward the tractor. The grabbing jaws and the terminus are preferably removable from the arms for facilitating the repair thereof. Also, preferably the grabbing jaws are pivotally mounted behind the tractor to facilitate the turning of a tractor which is towing a fallen tree.

BRIEF DESCRIPTION OF THE DRAWINGS

FIG. 1 is a perspective view of the farm implement for transporting fallen trees of the present invention.

FIG. 2 is a plan view of the farm implement of FIG. 1.

FIG. 6 is a side view of the farm implement of FIG. 1 held by a tractor and pulling a fallen tree.

FIG. 7 is a top plan view of the tractor implement and tree of FIG. 6 showing the tractor in a turning position.

DESCRIPTION OF THE PREFERRED EMBODIMENTS

Figure 3:
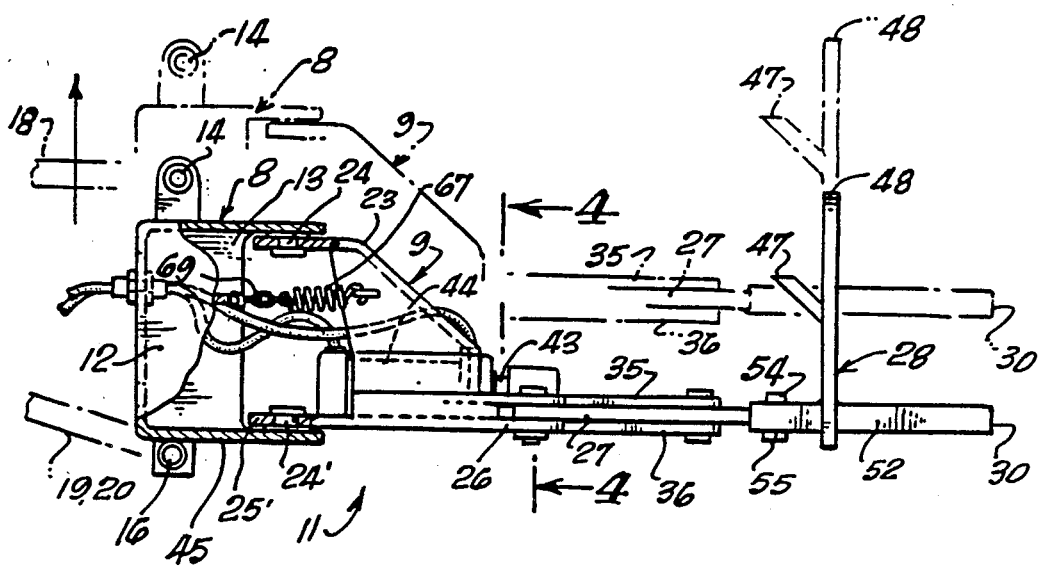
FIG. 3 is a side view of the farm implement of FIG. 1 showing the implement in a lowered position and in a phantom view in a raised position.
Figure 4:
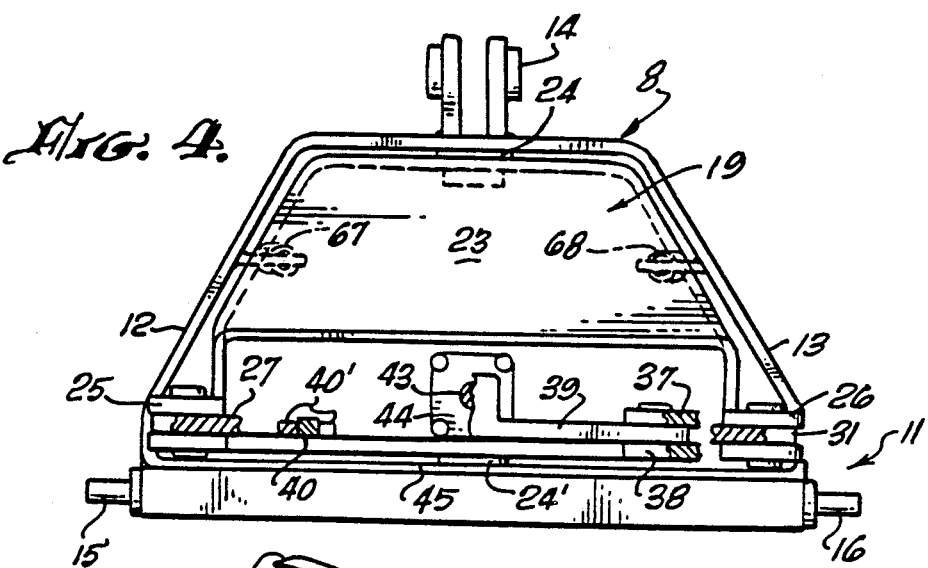
FIG. 4 is a cross-sectional view taken along line 4—4 of FIG. 2.

The farm implement of the present invention is shown in perspective view in FIG. 1 and indicated generally by reference character 10. The farm implement has a frame indicated generally by reference character 11 which comprises a tractor attachment portion 8 and a jaw portion 9. The tractor attachment portion 8 has a pair of support arms 12 and 13 which span the distance between an upper point of attachment 14 to a right lower point of attachment 15 and a left lower point of attachment 16.

The tractor which is indicated in FIG. 6 by reference character 17 has raiseable attachment means comprising a central upper arm 18 and a pair of lower arms 19 and 20. Arms 18, 19 and 20 are raiseable by a conventional hydraulic apparatus which may be operated by operator 21 without leaving the cab 22 of tractor 17.

Returning now to FIG. 1, jaw portion 9 of frame 11 also has a support shell 23 which is affixed to a pivot pin 24 which, in turn, is held by tractor attachment 8. Support shell 23 holds a left horizontal arm 25 and a right horizontal arm 26. Left horizontal arm 25 supports a first arm 27 horizontally hinged to the frame. First arm 27 has a first grabbing jaw 28 bolted thereto. The outer terminus of first arm 27 is indicated by reference character 29 and comes to a point 30 at the outer edge thereof. Similarly, a second arm 31 is horizontally hinged to the frame through right horizontal arm 26. Second arm 31 also has a second grabbing jaw 32 bolted thereto. The outer terminus of second arm 31 is indicated by reference character 33 and the point by reference character 34. The first arm 27 and the second arm 31 are synchronized so that they move inwardly and outwardly together. This is accomplished by two pairs of links 35 and 36 and 37 and 38. These two pairs of links are pinned to a cross arm 39 which operates the movement of the arm. Cross arm 39 is slideably supported by the frame through arms 40 and 41 which pass over cross member 42. Two pairs of guide bars 40' and 41' maintain arms 40 and 41 parallel to each other. Cross arm 39 is moved by a hydraulic cylinder assembly which includes cylinder 43 and a piston rod 44. As shown best in FIG. 2 of the drawings, as piston rod 44 moves inwardly, the first and second arms move inwardly toward one another, and the first and second grabbing jaws about touch resulting in a very secure grasping of the root system. The tractor attachment portion 8 has a floor 45 which supports a lower pivot pin 24'. Lower pivot pin 24' holds the cross arm 25' which connects and supports right and left horizontal arms 25 and 26.

The shape and placement of grabbing jaws 28 and 32 form an important part of the present invention. Each grabbing jaw has a plurality of inwardly directed teeth, and more specifically, grabbing jaw 28 has a lower tooth 46, a middle tooth 47 and an upper tooth 48. Both the lower tooth and the upper tooth face directly inwardly, and the middle tooth 47 is directed in a forward manner away from the outer terminus 29 of first arm 27. Similarly, grabbing jaw 32 has a lower tooth 49, a middle tooth 50 and an upper tooth 51 which are a mirror image of the teeth of first grabbing jaw 28.

Figure 5:
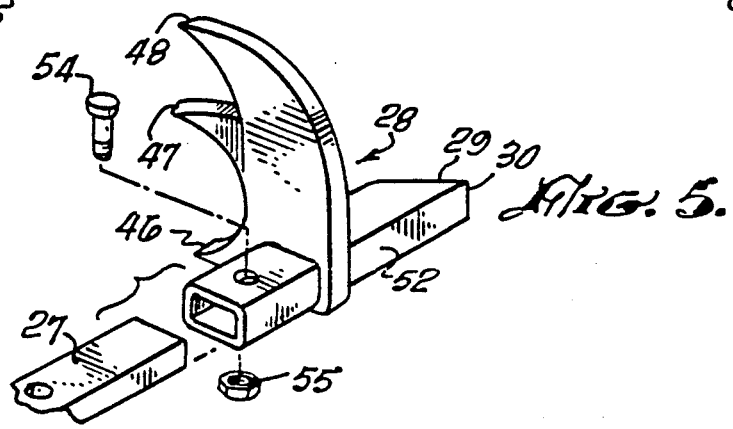
FIG. 5 is an exploded perspective view of the tip of one of the jaws of the farm implement of FIG. 1.

As shown best in FIGS. 1 and 5, the outer terminus of each arm is provided by a separate hollow member indicated by reference characters 52 and 53. These hollow point members 52 and 53 are welded to grabbing jaws 28 and 32 and may be removed by removing nut and bolt 54 and 55, respectively, to remove hollow point member 52 and nut and bolt 56 and 57 in the case of hollow point member 53. Since these points and the grabbing jaws are subjected to the most punishment, in this way they may be removed for repair at a remote location or simply replaced and the damaged member repaired later.

In operation, tractor 17, with its attached farm implement 10, is backed toward the roots of a fallen tree indicated by reference character 58 in FIG. 6. The tractor is backed so that the implement 10 and its grabbing jaws are located near the area where the roots 59 connect to the trunk 60 of tree 58. This is accomplished when the implement is in its lower position as shown in solid lines in FIG. 3. Next, the piston rod 44 is retracted which can be accomplished from within cab 22. The next step is to raise the implement to the position shown in phantom lines in FIG. 3 thereby lifting roots 59 off the ground as shown in FIG. 6. This can also be accomplished from within cab 22. As shown in FIG. 6, the tree is now resting on the ground 61 and is supported only by its branches 62 which spread the weight of tree 58 over a wide area. Next the tractor is driven away, and the branches do not form any deep divots in the ground 61.

The power takeoff means of the tractor is diagrammatically indicated in FIG. 6 by reference character 63. This comprises a hydraulic pump and valve assembly operable from within cab 22. Such assembly is conventional and need not be shown for an understanding of the present invention.

As shown best in FIG. 7, the jaw portion 9 is pivotally connected to tractor portion 8. This permits the tractor 17 to turn without forcing the tree 58 to make a wide sweep. In this way, tree 58 may be carefully guided between trees 65 and 66. This pivotal movement, however, is preferably limited by a pair of springs 67 and 68 shown best in FIG. 2. Spring 67 is connected at one end to the left side of support shell 23 and its other end to chain 69 which, in turn, is affixed to support arm 12. Spring 68 is connected to the right side of support shell 23 at one end and to a chain 70 at the other end which, in turn, is connected to support arm 13. These springs urge the jaw portion 9 into alignment along the central axis 71 of the implement. However, the springs also permit the type of turning action shown in FIG. 7. It has been shown that such pivoting motion substantially reduces the damage caused to an orchard by the removal of trees.

It can readily be seen that the operation of farm implement 10 eliminates most of the time necessary for attaching a chain around the roots and then removing the chain from the roots when the tree has been pulled to the lay down area. The operator never needs to leave the cab during the operation of farm implement 10. Also, the weight of the roots and trunk of the tree is added to the rear wheels 64 of the tractor giving them added traction in loose soil or wet ground.

While a hydraulic cylinder assembly is shown in the drawings, other means could be used to open and close the jaws such as electric motors, cables and pulleys. While three teeth are shown on the grabbing jaws, a larger or lesser number of teeth could be used, although three is a preferred number.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A farm implement for transporting fallen trees, said implement being attachable to a tractor including a raiseable attachment means and power take off means, said implement comprising:
    a frame having at least one point of attachment for attaching the frame to the raiseable attachment means of the tractor;
    a first arm horizontally hinged to said frame, said first arm being movable from an open position to a closed position and said first arm having an inner hinged end and an outer terminus;
    a first grabbing jaw affixed to said first arm near the terminus thereof, said first grabbing jaw including a plurality of large, vertically separated, generally inwardly directed grasping teeth;
    a second arm horizontally hinged to said frame, said second arm being movable from an open position to a closed position and said second arm also having an inner hinged end and an outer terminus and said first and second arms being movable in a single plane;
    a second grabbing jaw affixed to said second arm near the terminus thereof, said second grabbing jaw including a plurality of large, vertically separated, generally inwardly directed grasping teeth;
    synchronizing means attached to said first arm and to said second arm to cause the first and second arms to move together and apart simultaneously; and
    means to close and open said arms whereby said implement may be positioned about the roots of a fallen tree when the arms are apart and the arms closed to cause the first and second grabbing jaws to grasp the roots which may then be lifted and held by the jaws and moved with a minimum of damage to the soil.

2. The farm implement for transporting fallen trees of claim 1 wherein the first and second grabbing jaws each have a plurality of teeth, the teeth on one grabbing jaw being oriented inwardly toward the teeth of the other grabbing jaw.

3. The farm implement for transporting fallen trees of claim 2 wherein at least one of said teeth on each grabbing jaw is oriented inwardly and away from the outer terminus of the arm to which it is attached.

4. The farm implement for transporting fallen trees of claim 3 wherein each grabbing jaw has three teeth, an upper tooth, a middle tooth and a lower tooth and the middle tooth is oriented inwardly and away from the outer terminus of the arms to which they are attached.

5. The farm implement for transporting fallen trees of claim 1 wherein said synchronizing means comprises a plurality of link arms.

6. The farm implement for transporting fallen trees of claim 5 wherein said means to close and open said arms comprises a hydraulic piston assembly.

7. The farm implement for transporting fallen trees of claim 1 wherein said point of attachment includes a central upper point of attachment and a pair of separated lower points of attachment.

8. The farm implement for transporting fallen trees of claim 7 wherein said frame is fabricated in two parts, namely a tractor attachment portion and a jaw portion, said central and lower points of attachment being held by said tractor attachment portion and the first and second grabbing jaws being a portion of the jaw portion and said tractor attachment portion and said jaw portion being pivotally linked together by generally vertical pivot means so that the jaw portion can pivot horizontally.

9. The farm implement for transporting fallen trees of claim 8 wherein said tractor attachment portion and said jaw portion are linked together with a generally vertical pair of pivot points.

10. The farm implement for transporting fallen trees of claim 1 wherein said first and second grabbing jaws are integrally attached to the outer terminus of each arm and the assembly including the jaws and the terminus are removably attached to the arm of which it forms a part.

11. A farm implement for transporting fallen trees, said implement being attachable to a tractor including a raiseable attachment means and power take off means, said implement comprising:
   a frame having at least one upper point of attachment and at least one lower point of attachment for attaching the frame to the raiseable attachment means for the tractor;
   a first arm horizontally hinged to said frame, said first arm being movable from an open position to a closed position and said first arm having an inner hinged end and an outer terminus;
   a first grabbing jaw removable affixed to said first arm near the terminus thereof, said first grabbing jaw having a plurality of large inwardly directed teeth and a hollow, pointed terminus which fits over a portion of said first arm and extends substantially past said teeth;
   a second arm horizontally hinged to said frame, said second arm being movable from said open position to a closed position and said second arm also having an inner hinged end and an outer terminus and said first and second arms being movable in a single plane;
   a second grabbing jaw removably affixed to said second arm near the terminus thereof, said second grabbing jaw having a plurality of large inwardly directed teeth and a hollow, pointed terminus which fits over a portion of said second arm and extends substantially past said teeth;
   interconnected link means attached to said first arm and to said second arm to cause the first and second arms to move together and apart simultaneously; and
   hydraulic means to close and open said arms whereby said implement may be positioned about the roots of a fallen tree when the arms are apart and the arms closed to cause the first and second grabbing jaws to grasp the roots which may then be lifted and held by the jaws and moved with a minimum of damage to the soil.

12. The farm implement for transporting fallen trees of claim 11 wherein each grabbing jaw has three teeth, an upper tooth, a middle tooth and a lower tooth and the middle tooth is oriented inwardly and away from the outer terminus of the arms to which they are attached.

13. The farm implement for transporting fallen trees of claim 11 wherein the outer terminus of each arm is angled so that there is a point on the outer edge of each terminus.

14. The farm implement for transporting fallen trees of claim 11 wherein said hydraulic means to close and open said arms comprises a hydraulic cylinder held by said frame and a hydraulic piston and piston rod which rod extends horizontally outwardly and is attached at its outer end to a cross member which is connected to a link at each of its ends and which link at each end is, in turn, pinned to each of the arms near the midpoint of each arm so that when the hydraulic piston moves outwardly, the arms move apart and when the hydraulic cylinder moves inwardly, the arms move toward each other.

15. A farm implement for transporting fallen trees, said implement being attachable to a tractor including a raisable attachment means and power take off means, said implement comprising:
   a tractor attachment frame having at least one point of attachment for attaching the frame to the raisable attachment means for the tractor;
   a jaw frame pivotally held by said tractor attachment frame wherein said tractor attachment frame and said jaw frame are attached so that they pivot about a vertical axis of rotation;
   a first arm horizontally hinged to said jaw frame, said first arm being movable from an open position to a closed position and said first arm having an inner hinged end and an outer terminus;
   a first grabbing jaw affixed to said first arm near the terminus thereof;
   a second arm horizontally hinged to said jaw frame, said second arm being movable from an open position to a closed position and said second arm also having an inner hinged end and an outer terminus and said first and second arms being movable in a single plane;
   a second grabbing jaw affixed to said second arm near the terminus thereof;
   synchronizing means attached to said first arm and to said second arm to cause the first and second arms to move together and apart simultaneously; and
   means to close and open said arms whereby said implement may be positioned about the roots of a fallen tree when the arms are apart and the arms closed to cause the first and second grabbing jaws to grasp the roots which may then be lifted and held by the jaws and moved with a minimum of damage to the soil.

16. The farm implement for transporting fallen trees of claim 15 wherein said tractor attachment frame and said jaw frame are urged into axial alignment by spring means.

17. The farm implement for transporting fallen trees of claim 16 wherein said spring means comprise a pair of helical springs affixed between said tractor attachment frame and said jaw frame near the outer edge of each frame whereby said jaw frame is permitted to pivot with respect to the tractor attachment frame and yet is urged into alignment by the biasing action of said pair of helical springs.

* * * * *